Oct. 31, 1950        W. D. WASSELL        2,527,901
RECORD FILING AND SIGNALING CONSTRUCTION
Filed Feb. 16, 1946        2 Sheets-Sheet 1
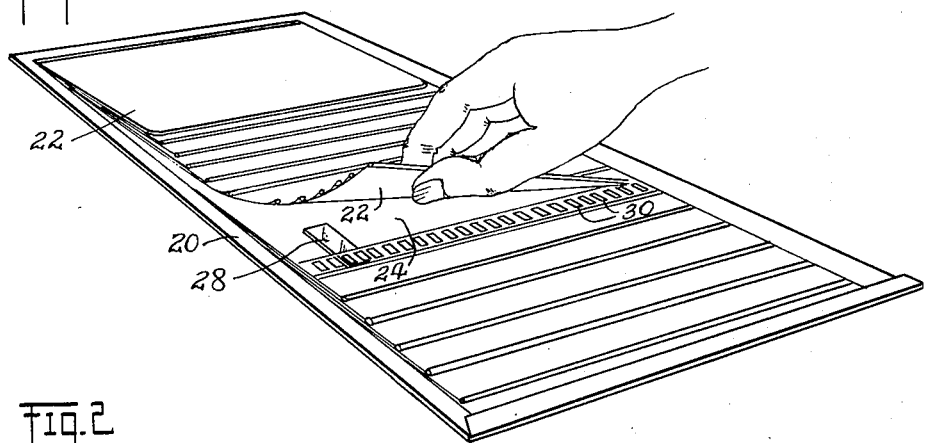
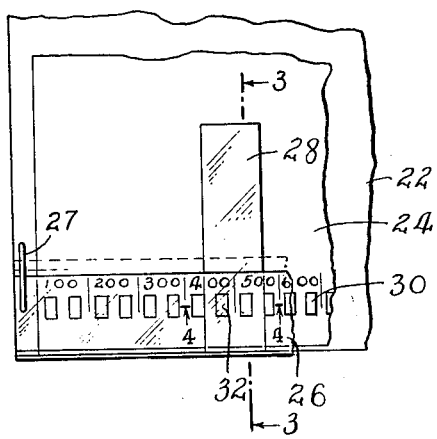
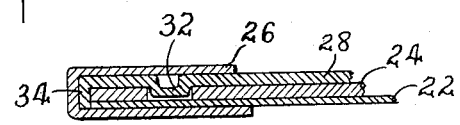
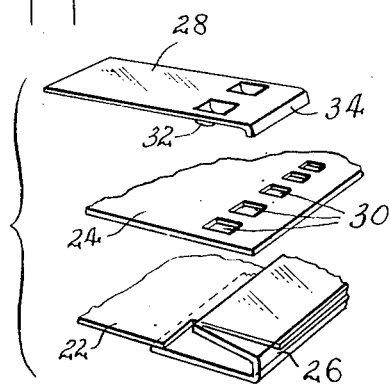
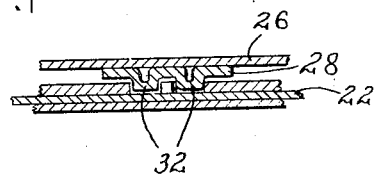
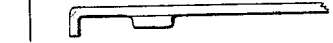
INVENTOR
Willard Dale Wassell
BY
Blair Curtis & Hayward
ATTORNEYS Oct. 31, 1950  W. D. WASSELL  2,527,901
RECORD FILING AND SIGNALING CONSTRUCTION
Filed Feb. 16, 1946  2 Sheets—Sheet 2
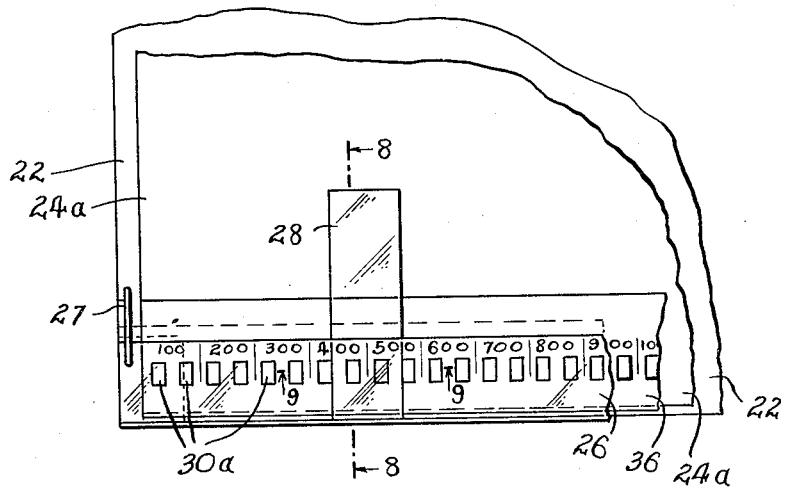
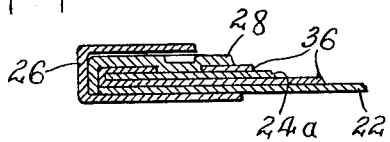
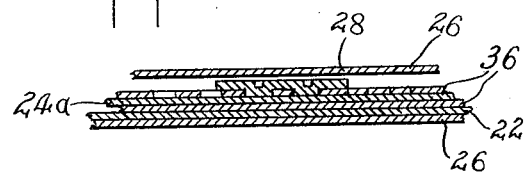
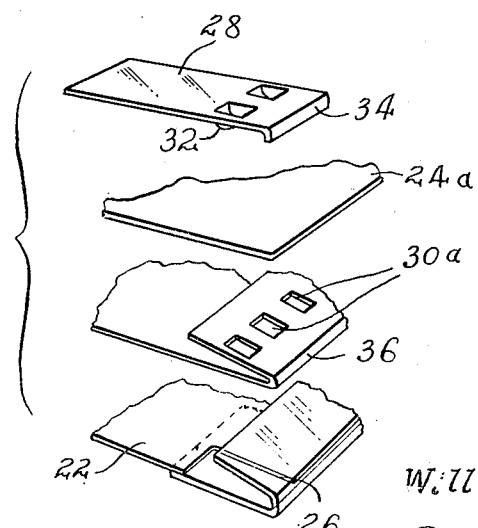
INVENTOR
*Willard Dale Wassell*
BY
*Blair Curtis & Hayward*
ATTORNEYS Patented Oct. 31, 1950

2,527,901

UNITED STATES PATENT OFFICE 2,527,901

RECORD FILING AND SIGNALING CONSTRUCTION

Willard Dale Wassell, Westport, Conn.

Application February 16, 1946, Serial No. 648,166

1 Claim. (Cl. 129—16.7)

This invention relates to constructions for maintaining business records. By way of example the invention will be described as applied to a system for maintaining running inventory records although other uses will occur to those familiar with the general subject matter.

Over a period of years there has been developed a number of systems of recording and utilizing certain statistics which form a part of any business. For example, a manufacturer whose product requires the use of machine screws must be in a position to determine readily at any time how many kinds of machine screws he stocks and the number on hand of each individual kind. Similarly, a patent lawyer must know not only how many applications he has on file in the various patent offices but also the date upon which is due an amendment or other response for each application. The manager of an office building should know how many fire extinguishers he has in the building, where they are, and the date upon which each was last inspected and declared to be in operating condition.

The various means whereby such records are kept ordinarily comprise individual cards, one for each item to be recorded. The cards are held in a book, or on a revolving rack, or in a tray, or otherwise and one or more signals usually are provided for each card to indicate on the card the amount or quality or condition of one or more variables. Thus, in the case of a patent lawyer, a card might identify a given application for patent and along one edge of the card would be indicated the days of the month. If an amendment were due on the twenty-first day of the month, a signal would be attached to the edge of the card at the point indicating the twenty-first day. In the case of a manufacturer, the card might show plating and material specifications for a 5-40½" round head machine screw, in which case the edge of the card would be graduated in hundreds or thousands and a signal on the edge of the card would indicate at all times the number of such 5-40 screws which the manufacturer had in stock. As changes in the inventory occurred the signal would be adjusted so that it correctly indicated the number of screws on hand.

Various record cards have been proposed for use in maintaining routine statistics and several types of signals for use with such cards have been suggested. Insofar as I am aware, however, there is not available any combination of card and signal which is sufficiently sure in operation to overcome the possibility that a given signal will be unintentionally displaced upon its card so as to indicate an incorrect number, or date, as the case may be. I have devised a combination of card and signal, however, which is easy to manufacture and which ensures against accidental displacement of signal with respect to card so that an accurate representation is at all times ensured. And my invention does not reduce the life of the cards themselves nor complicate their structure nor impair their readability nor require skillful manipulation to effect an adjustment to a signal.

It is an object of my invention to provide a card and signal construction such as described having to a notable extent the characteristics and capabilities set forth. Another object resides in the provision of means for maintaining office records and for calling attention to certain conditions thereof which means overcome various disadvantages inherent in previous card and signal constructions. A further object is to provide an improved card and signal arrangement which is easy to manufacture and use and which is substantially foolproof. Other objects will be in part pointed out as the description proceeds and will in part become apparent therefrom.

The invention accordingly consists in the features of construction, combinations of elements, arrangements of parts and methods of operations as will be exemplified in the structures and sequences and series of steps to be hereinafter indicated and the scope of the application of which will be set forth in the accompanying claim.

In the drawings:

Figure 1 is a perspective view of a holder for a series of record cards which embody the invention;

Figure 2 is a plan view on an enlarged scale of a portion of a record card construction illustrated in Figure 1;

Figure 3 is a sectional elevation taken along the line 3—3 of Figure 2;

Figure 4 is a sectional elevation taken along the line 4—4 of Figure 2;

Figure 5 is an exploded sectional perspective view of the elements which together are shown in Figure 2;

Figure 6 is an edge view of a signal shown in Figure 5;

Figure 7 is a view similar to that of Figure 2 but showing a modification of the invention;

Figure 8 is a sectional view taken along the line 8—8 of Figure 7;

Figure 9 is a sectional view taken along the line 9—9 of Figure 7; and

Figure 10 is an exploded sectional perspective view of the elements shown in Figure 7.

In Figure 1 a pocket holder is generally indicated at 20. It is provided with a series of card supporting means, known as "pockets," indicated at 22 each of which is hingedly attached across its upper edge in conventional manner to holder 20. The various pockets are arranged in overlapping position so that the lower portion of each pocket is exposed to visual inspection. In Figures 2 and 5 a pocket 22 is shown supporting a record card 24 with the aid of a strip 26 known to the trade as a "visible tip." Tip 26 in the present embodiment is made of a transparent material and a metal reinforcing staple 27 between the tip and the pocket is provided on each side of the card. Thus, the bottom portion of card 24 may bear printed graduations, as for example in hundreds, to show the number of screws in stock, and the graduations remain visible through the transparent tip. A signal 28 is provided to identify the number of screws in stock at any time. In the present form signal 28 is made from a resilient colored plastic sheet material and is about seven-eighths of an inch long and one-quarter of an inch wide. In some instances it might be an inch or more in width. Card 24 bears a series of apertures 30 extending in a row across the edge of the card within the pocket and under the visible tip 26. Signal 28 is formed with a pair of nubs 32 (see Figures 3 and 4) which fit into a selected pair of apertures and thus prevent relative edgewise movement between signal and card so long as the nubs are registered with the apertures. The number of such nubs present in any instance will depend somewhat upon the width of the individual signal. The signal is provided with a bent over end or "crimp" 34 which, as best seen in Figure 3, hooks over the lower edge of card 24 and of pocket forming piece 22 and is held in abutment thereagainst with the cooperation of visible tip 26. The signal may be moved by lifting nubs 32 from apertures 30 against the pressure of tip 26 and sliding it along the card while its crimp 34 engages and rides upon the bottom edge of the card.

The embodiment of Figures 6-9 is similar to that of Figures 2-5 and where identical parts are used identical reference characters appear. The modified card 24a (see Figure 10) is not apertured but instead a locking strip 36 is folded around the lower edge of the card (see Figure 7) and the locking strip is provided with apertures 30a which function as do the apertures 30 of the first embodiment. Thus, by using a locking strip such as 36, a card not embodying any feature of the invention can advantageously be converted to utilize the invention. The signal then cannot be inadvertently displaced with respect to the card. Where a locking strip 36 is positioned over the lower portion of a card the upper surface of the locking strip preferably should be printed or graduated to correspond to the portion of card 24a which it overlaps.

It is to be noted that with either of the illustrative forms of the invention the signal is locked against inadvertent lateral or vertical movement with respect to the card. Adjustments can readily be made but the nub and aperture arrangement, along with the crimped end of the signal engaging the card edge and pocket piece, ensure against those accidental movements between card and signal which have attended the use of prior constructions.

From the foregoing it will be observed that a record filing and signaling construction embodying my invention is well adapted to attain the ends and objects hereinbefore set forth and to be economically manufactured, since the separate parts are well suited to common production methods and are subject to a variety of modifications as may be desirable in adapting the invention to different applications.

As many embodiments may be made of the above invention and as changes may be made in the embodiments above set forth, it is to be understood that all matter hereinbefore set forth or shown in the accompanying drawings is to be interpreted as illustrative and not in a limiting sense.

I claim:

In a construction for maintaining records and statistical compilations and for indicating desired conditions thereof, the combination of: a card support, a tip extending from and along one edge of the support and having a portion folded back to form an elongated narrow pocket operatively integral with the card support, an indicia-bearing record card adapted to be carried by the support when an edge portion of the card is inserted in the elongated pocket, and a flat-surfaced signal adapted to be interposed between the card and the folded back portion of the card support tip with a flat surface of the signal against the card; the card being provided with a series of recesses along the portion of the card positioned within the pocket, the recesses being respectively related to indicia on the card, each recess having generally opposite abutment faces in substantial alignment with the edge of the card positioned in the pocket, the signal having a boss projecting from its flat card-contacting surface shaped and positioned to register with and enter any selected recess in the card and having sufficient length of projection to make effective impinging contact with an abutment face of the recess wherein it lies in case of relative lateral movement between card and signal, whereby substantial unintended lateral relative movement between card and signal is prevented, the card and signal being effectively maintained in interlocking relationship regardless of any relative lateral displacement between card and card support.

WILLARD DALE WASSELL.

REFERENCES CITED

The following references are of record in the file of this patent:

UNITED STATES PATENTS

| Number | Name | Date |
|---|---|---|
| 850,245 | Newald | Apr. 16, 1907 |
| 1,295,837 | Barker | Mar. 4, 1919 |
| 1,317,643 | Rand | Sept. 30, 1919 |
| 1,530,012 | Rand | Mar. 17, 1925 |
| 1,558,629 | Rand | Oct. 27, 1925 |
| 1,645,598 | Johnson | Oct. 18, 1927 |
| 1,768,292 | Power | June 24, 1930 |
| 2,122,223 | Von Dollen | June 28, 1938 |
| 2,328,741 | Reiste | Sept. 17, 1943 |

FOREIGN PATENTS

| Number | Country | Date |
|---|---|---|
| 484,873 | Great Britain | May 11, 1938 |